J. E. BURNS.
CUTTING TOOL.
APPLICATION FILED SEPT. 25, 1919.

1,388,547.

Patented Aug. 23, 1921.

Inventor
By Joseph E. Burns
Attorneys

UNITED STATES PATENT OFFICE.

JOSEPH E. BURNS, OF SYRACUSE, NEW YORK.

CUTTING-TOOL.

1,388,547. Specification of Letters Patent. Patented Aug. 23, 1921.

Application filed September 25, 1919. Serial No. 326,364.

*To all whom it may concern:*

Be it known that I, JOSEPH E. BURNS, of Syracuse, in the county of Onondaga, in the State of New York, have invented new and useful Improvements in Cutting-Tools, of which the following, taken in connection with the accompanying drawings, is a full, clear, and exact description.

This invention relates to certain improvements in edge tools or cutting blades, including knives of all characters and is closely related to the invention of my copending application, Ser. No. 296,995, filed May 14, 1919.

The object of the invention is to produce an improved and highly efficient cutting blade and in my copending application, I have described a method of serrating edge tools by the use of a properly shaped grinding wheel formed of suitable abrasive material and the invention of this application relates specifically to the formation and relative disposition of the grooves ground at the edge of the tool to form these serrations so that the knife cuts easily and rapidly when moved in either longitudinal direction.

Other objects and advantages relate to the details of formation, arrangement and construction of the tool as hereinafter described and claimed.

In the drawings—

Figure 1:
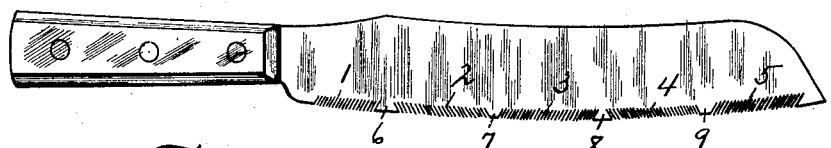
Figure 1 is an elevation of a knife suitable for cutting bread, the grooves and serrations at the edge being illustrated more or less diagrammatically.
Figure 2:
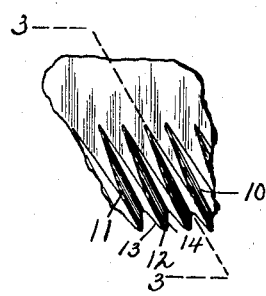
Fig. 2 is an enlarged illustration of a portion of the knife of Fig. 1 showing the inclined grooves and the serrations or teeth formed thereby.

I have illustrated my invention as applied to a knife adapted for cutting bread and it consists in the formation of a plurality of series of substantially parallel grooves intersecting the edge of the knife and forming a plurality or series of serrations or teeth inclined in opposite directions with respect to a lateral axis of the knife. The series of serrations may be and are preferably separated by a plain or unserrated portion which as a result of the opposite inclinations of the adjacent grooves is of keystone shape, the adjacent plain portions having their taper extending in opposite directions as a result of the opposite inclination of the adjacent grooves, serrations or teeth.

Each series of grooves may comprise any suitable number to form any desired number of serrations or teeth and in the illustration I have shown five series of grooves and the number of grooves in each series may be the same or may vary as desired and the spaced distance of each series may vary as desired or may be uniform throughout.

Perhaps the preferred method of forming the edge as shown in the figures is by the use of a rotary grooving wheel formed with a plurality of circumferentially extending parallel ridges, the number of said ridges being equal to the desired number of grooves to be formed to constitute a single series. By the use of such a wheel all of the grooves of one series may be ground simultaneously and by this method the spacing and formation of the grooves is rendered perhaps more uniform than otherwise would be the case. However, such method of forming a plurality of grooves simultaneously is not essential to my invention. It will be noted that the teeth of series 1 incline rearwardly and the teeth of series 2 incline forwardly of the knife —A—, that the teeth of series 3 and 5 also incline rearwardly while the teeth of series 4 incline forwardly and that the said series of grooves or serrations are spaced by plain portions 6, 7, 8 and 9, all of substantially keystone shape, approaching triangular formation. The taper or plain portions 6 and 8 being opposite the taper of the plain portions 7 and 9.

The inclination of the grooves —10— will shape the forward portion —12— of the tooth or serration —11— so that its edge —14— is substantially perpendicular to the longitudinal axis of the knife while the rear portion —13— of the tooth is obliquely inclined to a material extent with reference to the forward portion.

Figure 3:
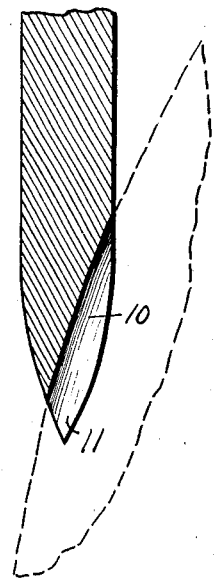
Fig. 3 illustrates a method of forming the serrations by the use of a rotary grinding wheel indicated in dotted lines.

The portion of tools adjacent their cutting edge is usually tapered in cross section as shown in Fig. 3 and I believe that the grinding of a plurality of substantially parallel grooves on such a tapered edge portion is new and I have claimed the same in my said copending application and I further contemplate as new the grinding of a plurality of grooves upon such an edge when said grooves are inclined with respect to the lateral axis of the tool.

In practice I have found that by forming the knife as shown in Fig. 1, it cuts rapidly and easily when drawn in either direction and its efficiency for the purpose described is materially increased.

Any suitable number of series of grooves and serrations may be formed on the blade and the number of grooves in each of the series may be varied and the spaced distance of the series may be varied and the relative inclination of the grooves in the several series may be varied, all within the scope of my invention as set forth in the appended claims.

What I claim is:—

1. An edged tool provided with a plurality of series of obliquely disposed grooves forming a plurality of series of relatively fine accurately shaped ground teeth, the grooves of each series being inclined with respect to the edge of said tool in a direction offset to the direction of inclination of the adjacent series of ground grooves.

2. An edge tool provided with a plurality of series of obliquely disposed grooves, forming a plurality of series of relatively fine accurately shaped ground teeth, the grooves of each series being inclined with respect to the edge of said tool in a direction offset to the direction of inclinaton of the adjacent series of ground grooves, and key-stone shaped, smooth edged parts separating adjacent series of ground grooves.

In witness whereof I have hereunto set my hand this 13th day of September, 1919.

JOSEPH E. BURNS.

Witnesses:
H. E. CHASE,
E. A. THOMPSON.